(12) United States Patent
Movellan et al.

(10) Patent No.: US 9,779,289 B2
(45) Date of Patent: *Oct. 3, 2017

(54) COLLECTION OF MACHINE LEARNING TRAINING DATA FOR EXPRESSION RECOGNITION

(71) Applicant: Emotient, Inc., San Diego, CA (US)

(72) Inventors: Javier Movellan, La Jolla, CA (US); Marian Stewart Bartlett, San Diego, CA (US); Ian Fasel, San Diego, CA (US); Gwen Ford Littlewort, Solana Beach, CA (US); Joshua Susskind, La Jolla, CA (US); Jacob Whitehill, Cambridge, MA (US)

(73) Assignee: Emotient, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/656,687

(22) Filed: Mar. 12, 2015

(65) Prior Publication Data
US 2015/0186712 A1 Jul. 2, 2015

Related U.S. Application Data

(63) Continuation of application No. 14/177,174, filed on Feb. 10, 2014, now Pat. No. 9,008,416.
(Continued)

(51) Int. Cl.
*G06K 9/62* (2006.01)
*G06K 9/00* (2006.01)
*G06K 9/03* (2006.01)

(52) U.S. Cl.
CPC ..... *G06K 9/00302* (2013.01); *G06K 9/00308* (2013.01); *G06K 9/036* (2013.01); *G06K 9/6262* (2013.01)

(58) Field of Classification Search
CPC ............ G06K 9/00302; G06K 9/6252; G06K 9/6267; G06K 9/00288; G06K 9/6256;
(Continued)

(56) References Cited

U.S. PATENT DOCUMENTS

| 8,116,538 B2 * | 2/2012 | Kim ................... G06K 9/00255 382/118 |
| 8,219,438 B1 | 7/2012 | Moon et al. |

(Continued)

OTHER PUBLICATIONS

McDuff, et al., "Crowdsourced Data Collection of Facial Responses," Nov. 2011, ICMI, p. 11-18.
(Continued)

*Primary Examiner* — Mekonen Bekele
(74) *Attorney, Agent, or Firm* — Blank Rome LLP (57) ABSTRACT

Apparatus, methods, and articles of manufacture for implementing crowdsourcing pipelines that generate training examples for machine learning expression classifiers. Crowdsourcing providers actively generate images with expressions, according to cues or goals. The cues or goals may be to mimic an expression or appear in a certain way, or to "break" an existing expression recognizer. The images are collected and rated by same or different crowdsourcing providers, and the images that meet a first quality criterion are then vetted by expert(s). The vetted images are then used as positive or negative examples in training machine learning expression classifiers.

19 Claims, 8 Drawing Sheets

Related U.S. Application Data (60) Provisional application No. 61/762,820, filed on Feb. 8, 2013.

(58) Field of Classification Search
CPC ...... G06K 9/6218; G06K 9/62; G06K 9/6263; G06K 9/6292; G06N 7/02; G06N 7/005; G06N 5/022; G05B 13/0275
USPC .......................................... 382/155, 161, 159
See application file for complete search history.

(56) References Cited

U.S. PATENT DOCUMENTS

| | | | | |
|---|---|---|---|---|
| 8,620,036 | B2* | 12/2013 | Irmatov | G06K 9/00221 382/118 |
| 9,008,416 | B2* | 4/2015 | Movellan | G06K 9/00302 382/159 |
| 2005/0102246 | A1* | 5/2005 | Movellan | G06K 9/00248 706/12 |
| 2007/0047786 | A1* | 3/2007 | Aklilu | G06K 9/6255 382/128 |
| 2009/0285456 | A1 | 11/2009 | Moon et al. | |
| 2009/0299824 | A1 | 12/2009 | Barnes, Jr. | |
| 2010/0253804 | A1* | 10/2010 | Lee | H04N 5/772 348/231.2 |
| 2011/0135166 | A1* | 6/2011 | Wechsler | G06K 9/00288 382/118 |
| 2012/0182447 | A1 | 7/2012 | Gabay | |
| 2013/0322733 | A1* | 12/2013 | Tarnowski | G06T 7/0004 382/141 |
| 2014/0279583 | A1* | 9/2014 | Surdeanu | G06Q 50/184 705/310 |
| 2015/0154441 | A1* | 6/2015 | Zhang | G06K 9/00221 382/118 |
| 2016/0063993 | A1* | 3/2016 | Dolan | G10L 15/08 704/254 |
| 2017/0031953 | A1* | 2/2017 | Tang | G06N 7/005 |

OTHER PUBLICATIONS

Natalie C. Ebner, et al., "FACES—A database of facial expressions in young, middle-aged, and older women and men: Development and validation," Behavior Research Methods, vol. 42, No. 1, Feb. 1, 2010 (Feb. 1, 2010) pp. 351-362, XP055300954, ISSN: 1554-351X, DOI: 10.3758/BRM.42.1.351.

Kanade T., et al., "Comprehensive database for facial expression analysis," Proceedings / Fourth IEEE International Conference on Automatic Face and Gesture Recognition: Mar. 28-30, 2000, Grenoble, France, IEEE Computer Society, Los Alamitos, Calif. [U.A.], Mar. 28, 2000 (Mar. 28, 2000), pp. 46-53, XP010378322, DOI: 10.1109/AFGR.2000.840611 ISBN: 978-0-7695-0580-0.

Pantic M., et al., "Web-Based Database for Facial Expression Analysis," IEEE International Conference on Multimedia and Expo, 2005, ICME 2005, Amsterdam, The Netherlands, July 6-8, 2005, IEEE, Piscataway, NJ, USA, Jul. 6, 2005 (Jul. 6, 2005), pp. 317-321, XP010844376, DOI: 10.1109/ICME.2005.1521424, ISBN: 978-0-7803-9331-8.

Bartlett M. S., et al., "Machine learning methods for fully automatic recognition of facial expressions and facial actions," Systems, Man and Cybernetics, 2004 IEEE International Conference on, IEEE, Piscataway, NJ. USA, vol. 1, Oct. 10, 2004 (Oct. 10, 2004), pp. 592-597, XP010773665, ISBN: 978-0-7803-8566-5.

* cited by examiner

COLLECTION OF MACHINE LEARNING TRAINING DATA FOR EXPRESSION RECOGNITION

CROSS-REFERENCE TO RELATED APPLICATION

This application claims the benefit of and priority to U.S. provisional patent application Ser. No. 61/762,820, entitled SYSTEM FOR COLLECTING MACHINE LEARNING TRAINING DATA FOR FACIAL EXPRESSION RECOGNITION, filed on Feb. 8, 2013, and commonly owned, co-pending U.S. non-provisional application Ser. No. 14/177,174, filed 10 Feb. 2014, each of which is hereby incorporated by reference in its entirety as if fully set forth herein, including text, figures, claims, tables, and computer program listing appendices (if present), and all other matter in the United States patent applications.

FIELD OF THE INVENTION

This document relates generally to apparatus, methods, and articles of manufacture for collection of training examples for visual machine learning classifiers of expressions of emotions, affective states, action units, and similar psychological states; the use of such training examples in training machine learning classifiers; and machine learning classifiers of expressions of emotions, affective states, action units, and similar psychological states.

BACKGROUND

There are many uses for automated recognition of expressions of emotions, affective states, and similar psychological states. Perhaps the best known use is the smile detection in digital cameras. But there are others, including detection of facial reactions in response to various external stimuli, such as consumer reactions to advertisements, product displays, labeling, packaging, and pricing; and voter facial reactions to talking points and evaluation of debate performance. This list is far from exclusive.

It is desirable to automate recognition of expressions of emotions, affective states, and similar psychological states. Such automation reduces the costs of recognition, and also provides a measure of objectivity to the result of the recognition process. Automated (or machine) recognition of expressions of emotions, affective states, and similar psychological states is not a trivial design task, because facial expressions, poses, gestures and other face/body movements are not easy to define using standard programming techniques. Machine learning is a collection of techniques that may be used for this purpose. Machine learning allows artificial intelligence systems to learn from examples, in effect performing self-adaptation based on the training data. These techniques typically require large and carefully collected datasets of training examples, for example, a large number of sample images of different people, in different illumination conditions, of various ethnicities and different ages, and with a range of facial artifacts. The examples are needed to allow the machine classifier (recognizer) to discover the features that discriminate between different expression categories. While it may be relatively easy to collect examples of posed smiles from the Web, it is difficult to collect a large number of examples of real or realistic expressions of emotions such as fear, contempt, anger, disgust, and others.

A need exists for improved methods and apparatus for automatically detecting and classifying psychological states as exhibited by facial expressions, poses, gestures and other face/body movements, whether in reaction to known stimuli or otherwise. A need also exists for efficient methods to generate and collect data that can be used for training automatic classifiers of expressions of emotions, affective states, and similar psychological states.

SUMMARY

Embodiments described in this document are directed to methods, apparatus, and articles of manufacture that may satisfy one or more of the above described and other needs.

In an embodiment, a computer-implemented method includes providing cues to a first plurality of untrained providers for mimicking a predetermined expression; receiving from the first plurality of untrained providers images created in response to the step of providing cues; sending requests to rate the images to a second plurality of untrained providers; in response to the step of sending requests, receiving ratings of the second plurality of untrained providers; applying a first quality check to the images rated by the second plurality of untrained providers, the first quality check being based on the ratings of the second plurality of untrained providers, the step of applying the first quality check resulting in a plurality of images that passed the first quality check; sending the plurality of images that passed the first quality check to one or more experts, for rating by the one or more experts; in response to the step of sending the plurality of images, receiving ratings from the one or more experts; applying a second quality check to the images rated by the one or more experts, the second quality check being based on the ratings of the one or more experts, the step of applying the second quality check resulting in one or more images that passed the second quality check; training a classifier using the one or more images that passed the second quality check; and using the classifier after the step of training.

In an embodiment, a computer-implemented method comprises providing goals to a first plurality of untrained providers for breaking a classifier of a predetermined expression; receiving from the first plurality of untrained providers images created in response to the step of providing goals, resulting in a plurality of received images; checking the received images with the classifier and discarding images that do not meet objective goal of the goals provided, resulting in objectively qualified images; sending requests to rate the objectively qualified images to a second plurality of untrained providers; in response to the step of sending requests, receiving ratings of the second plurality of untrained providers; applying a first quality check to the images rated by the second plurality of untrained providers, the first quality check being based on the ratings of the second plurality of untrained providers, the step of applying the first quality check resulting in a plurality of images that passed the first quality check; sending the plurality of images that passed the first quality check to one or more experts, for rating by the one or more experts; in response to the step of sending the plurality of images, receiving ratings from the one or more experts; applying a second quality check to the images rated by the one or more experts, the second quality check being based on the ratings of the one or more experts, the step of applying the second quality check resulting in one or more images that passed the second quality check; training a classifier using the one or more images that passed the second quality check; and using the classifier after the step of training.

These and other features and aspects will be better understood with reference to the following description, drawings, and appended claims.

DETAILED DESCRIPTION

In this document, the words "embodiment," "variant," "example," and similar expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar expressions and phrases may be used to indicate one of a number of different possible embodiments. The number of possible embodiments/variants/examples is not necessarily limited to two or any other quantity. Characterization of an item as "exemplary" means that the item is used as an example. Such characterization of an embodiment/variant/example does not necessarily mean that the embodiment/variant/example is a preferred one; the embodiment/variant/example may but need not be a currently preferred one. All embodiments/variants/examples are described for illustration purposes and are not necessarily strictly limiting.

The words "couple," "connect," and similar expressions with their inflectional morphemes do not necessarily import an immediate or direct connection, but include within their meaning connections through mediate elements.

"Affective" information associated with an image or video includes various types of psychological reactions, such as affective, cognitive, physiological, and/or behavioral responses, including both recorded raw signals and their interpretations. Relevant information that represents or describes a particular person's reaction(s) toward a stimulus in terms of the person's affective, cognitive, physiological, or behavioral responses is referred to in the present description as affective information. The affective information can be attributable to psychological and physiological reactions such as memories, associations, and the like.

"Causing to be displayed" and analogous expressions refer to taking one or more actions that result in displaying. A computer or a mobile device (such as a smart phone or tablet), under control of program code, may cause to be displayed a picture and/or text, for example, to the user of the computer. Additionally, a server computer under control of program code may cause a web page or other information to be displayed by making the web page or other information available for access by a client computer or mobile device, over a network, such as the Internet, which web page the client computer or mobile device may then display to a user of the computer or the mobile device.

"Causing to be rendered" and analogous expressions refer to taking one or more actions that result in displaying and/or creating and emitting sounds. These expressions include within their meaning the expression "causing to be displayed," as defined above. Additionally, these expressions include within their meaning causing emission of sound.

References to "images" used as training data refer to still images, videos, and both still images and videos. A "picture" is a still image. "Video" refers to motion graphics.

"Facial expressions" as used in this document signifies the facial expressions of primary emotion (such as Anger, Contempt, Disgust, Fear, Happiness, Sadness, Surprise, Neutral); as well as expressions of affective state of interest (such as boredom, interest, engagement); and so-called "action units" (movements of a subset of facial muscles, including movement of individual muscles). The term "facial expressions" includes head poses and gestures.

"Mental state" as used in this document means emotion, affective state, or similar psychological state; "expression of emotion, affective state, and similar psychological state" means expression of emotion, affective state, or similar psychological state.

As used in this document, a classifier "breaks" or is "broken" when it makes a mistake in classifying a data sample. Thus, the classifier breaks when it detects a target emotion or affective state in an image that to people does not have the appearance of an expression of the target emotion or affective state. The classifier also breaks when it fails to detect the target emotion or affective state in image that has the appearance of an expression of the target emotion or affective state.

Other and further explicit and implicit definitions and clarifications of definitions may be found throughout this document.

Reference will be made in detail to several embodiments that are illustrated in the accompanying drawings. Same reference numerals are used in the drawings and the description to refer to the same apparatus elements and method steps. The drawings are in a simplified form, not to scale, and omit apparatus elements and method steps that can be added to the described systems and methods, while possibly including certain optional elements and steps.

Advantageously, mimicry can be employed to generate realistic training examples of expressions of mental states, for use as training data, and/or for other purposes. In an example, data is collected through the Web. Users have camera-equipped communication devices, and can send images of their faces to a server. This may be done using a crowdsourcing service, like the Amazon Mechanical Turk.

The Amazon Mechanical Turk is a crowdsourcing Internet-based resource that enables "requesters" to manage the use of human intelligence for various tasks, such as tasks that computers are not well equipped to perform at this time. The requesters are able to post tasks that "providers" or "Turkers" can perform for compensation set by the requesters. Note that the use of the terms "Turker," "requester," or "provider" and related terms does not necessarily signify Amazon's resource, but applies to any crowdsourcing resource.

Figure 1:
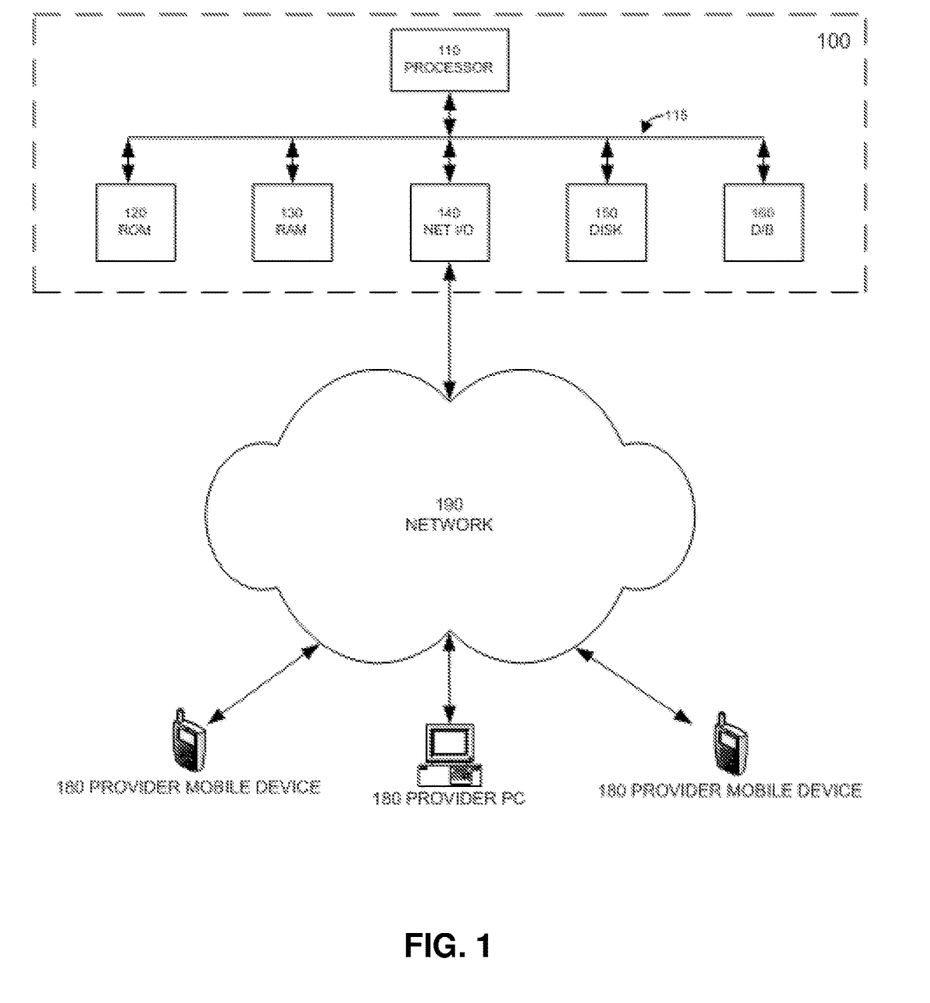
FIG. 1 is a simplified block diagram representation of a computer-based system configured in accordance with selected aspects of the present description.

FIG. 1 is a simplified block diagram representation of a computer-based system 100, configured in accordance with selected aspects of the present description to interact with crowdsourcing providers at provider machines 180 (such as personal computers or PCs, smartphones, tablets, network-enabled cameras) through a communication network 190. In particular, the system 100 and the provider machines 180 may be configured for use in obtaining training data through the use of mimicry, as is described in this document.

FIG. 1 does not show many hardware and software modules of the system 100 or of the provider machines 180, and omits several physical and logical connections. The system 100 may be implemented as a special purpose data processor, a general-purpose computer, a computer system, or a group of networked computers or computer systems configured to perform the steps of the methods described in this document. In some embodiments, the system 100 is built on a personal computer platform, such as a Wintel PC, a Linux computer, or a Mac computer. The personal computer may be a desktop or a notebook computer. The system 100 may function as a server computer. In some embodiments, the system 100 is implemented as a plurality of computers interconnected by a network, such as the network 190, or another network.

As shown in FIG. 1, the system 100 includes a processor 110, read only memory (ROM) module 120, random access memory (RAM) module 130, network interface 140, a mass storage device 150, and a database 160. These components are coupled together by a bus 115. In the illustrated embodiment, the processor 110 may be a microprocessor, and the mass storage device 150 may be a magnetic disk drive. The mass storage device 150 and each of the memory modules 120 and 130 are connected to the processor 110 to allow the processor 110 to write data into and read data from these storage and memory devices. The network interface 140 couples the processor 110 to the network 190, for example, the Internet. The nature of the network 190 and of the devices that may be interposed between the system 100 and the network 190 determine the kind of network interface 140 used in the system 100. In some embodiments, for example, the network interface 140 is an Ethernet interface that connects the system 100 to a local area network, which, in turn, connects to the Internet. The network 190 may, therefore, in fact include a collection of networks.

The database 160 may be used for organizing and storing data that may be needed or desired in performing the method steps described in this document. The database 160 may be a physically separate system coupled to the processor 110. In alternative embodiments, the processor 110 and the mass storage device 150 may be configured to perform the functions of the database 160.

The processor 110 may read and execute program code instructions stored in the ROM module 120, the RAM module 130, and/or the storage device 150. Under control of the program code, the processor 110 may configure the system 100 to perform the steps of the methods described or mentioned in this document. In addition to the ROM/RAM modules 120/130 and the storage device 150, the program code instructions may be stored in other machine-readable tangible storage media, such as additional hard drives, floppy diskettes, CD-ROMs, DVDs, Flash memories, and similar devices. The program code can also be transmitted over a transmission medium, for example, over electrical wiring or cabling, through optical fiber, wirelessly, or by any other form of physical transmission. The transmission can take place over a dedicated link between telecommunication devices, or through a wide area or a local area network, such as the Internet, an intranet, extranet, or any other kind of public or private network. The program code may also be downloaded into the system 100 through the network interface 140 or another network interface.

In embodiments, the system 100 may function as a crowdsourcing server that enables the providers at the machines 180 to perform the human intelligence tasks ("HITs") specified by the system 100. The descriptions of the tasks may be predetermined and stored in one of the storage devices of the system 100, or received by the system 100 from another device or person. Those skilled in the art should be familiar with the Amazon Web Services implementing the Amazon Mechanical Turk that performs crowdsourcing functions.

The system 100 may store the information received from the providers in a database, which database may be implemented with the components of the system 100, and/or other components. The database storing the information from the providers may be the database 160.

Figure 2:
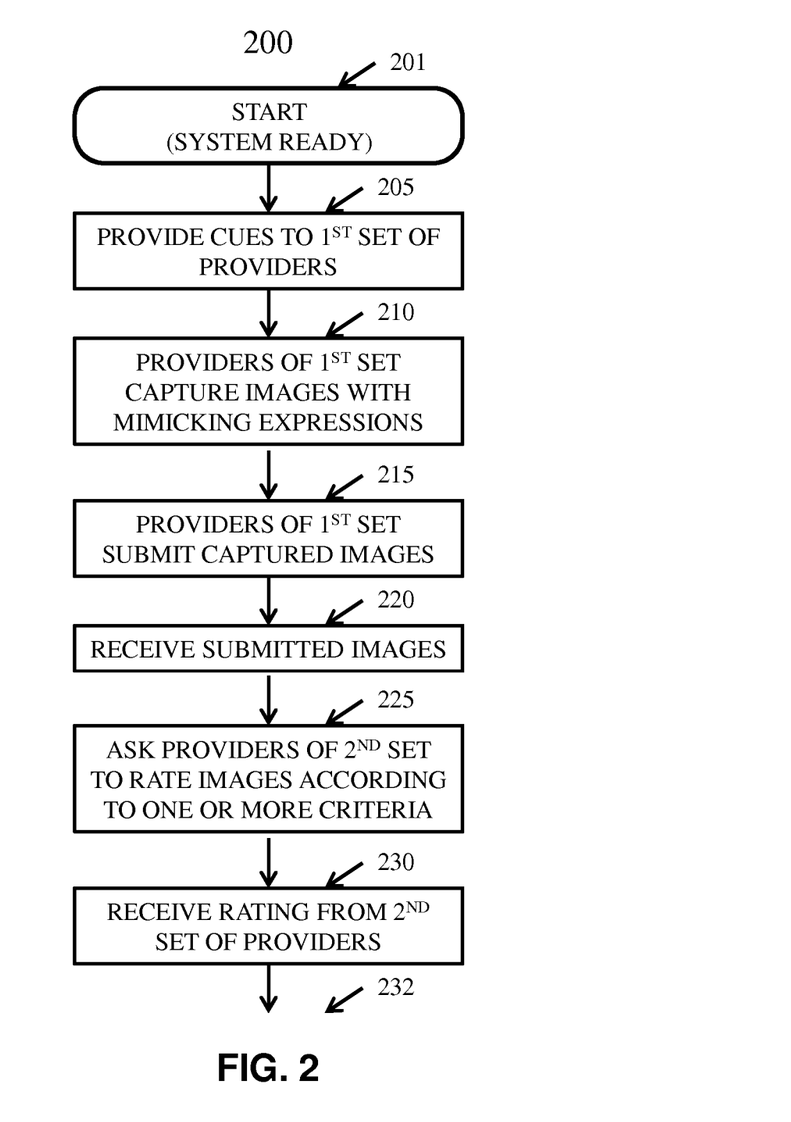
FIG. 2 illustrates selected steps of a process for generating training data for automatic expression classifiers.

FIG. 2 illustrates selected steps of a process 200 for presenting crowdsourcing providers examples of target facial expressions, asking the providers to mimic those expressions, and selecting/using training examples from the images. In embodiments, some or all of the examples may be chosen based on relationships between emotions and their expressions detectable through facial movements described in terms of elements of a system for describing facial movements, such as action units of the Facial Action Coding System (FACS), or other research.

At flow point 201, the system 100 and at least some provider machines are configured to communicate with each other and to perform the other steps of the process. Note that various providers may communicate with the system 100 at different times, and accordingly their machines may be configured at different times.

In step 205, one or more providers of a first set of providers are given cues about which features of the facial expression they should mimic/reproduce; the cues may include verbal (sound, written) instructions of what to do, pictures/videos to mimic or reproduce, references to online or other materials describing the expressions, other cues, and combinations of any of these. The providers of the first set need not be specially trained in facial expression recognition. For example, the system 100 and the respective machine of the provider cause the example expression (or portion thereof) to be displayed to the provider, and/or causes to be displayed or rendered to the provider instructions for mimicking the expression or the portion of the expression ("look like this," "look afraid," "look bored," "look happy," "look excited," "look scared," "look engaged," "make this kind of wrinkle," "raise your eyebrows as if you are surprised," "look at and mimic that part of the displayed face"). The example and/or the instructions may be stored in the database 160 or elsewhere, and transmitted to the provider through the network 190, by mail, or otherwise.

In step 210, the providers of the first set create the expressions and capture them, for example, making facial expressions and using still or video cameras in their respective machines 180. Again, here and elsewhere, the providers may perform the steps at different times.

In step 215, the providers of the first set submit the images with the expressions to the system 100, for example, causing the images to be transmitted over the network 190.

In step 220, the system 100 receives the images with the expressions, for example, through the network 190.

In step 225, one or more providers of a second set of providers are asked to rate the images with the expressions from the first set of providers, with respect to a set of predetermined criteria or criterion. The providers of the second set also need not be specially trained in facial expression recognition. For example, the system 100 and/or the machines 180 of the respective providers of the second set cause to be displayed to the providers of the second set the criteria and/or the questions. For example, this may be done by displaying an image and asking "does this look like a smile?" The displayed information (criteria/questions) may ask the providers of the second set, how well does the displayed expression matches a specific of emotion, such as anger, contempt, disgust, fear, happiness, sadness, surprise, or another expression, affective state, or action unit; the specific emotion, affective state, or action unit may be the same one that the providers of the first state were asked to mimic. The displayed question may also or instead ask, how well does the displayed expression (previously obtained in the steps 210-220) mimic the sample expression (which was given or defined to the first set of providers in the steps 205). In embodiments, the providers of the second set may be asked to pass or fail each expression. In embodiments, the providers of the second set may be asked to grade the expressions; the grades may be as follows: 1. Looks nothing like it; 2. A poor attempt; 3. OK; 4. A pretty good attempt; 5. Incredibly good mimicking.

In embodiments, the providers of the second set are all different from the providers of the first set. In embodiments, there may be at least some or even a complete overlap between the providers of the second set and the providers of the first set. In variants that are not necessarily limiting, no provider is asked to rate his or her own submission(s) of the images with the expressions.

In step 230, which may be performed in response to the step 225, the providers of the second set rate how well each of the rated expressions matches the mimicked expression, or how well each of the expressions is under the predetermined criteria or criterion. The machines 180 may receive the ratings given by the providers of the second set and transmit them to the system 100, for example, over the network 190. The system 100 receives the ratings, for example, over the network 190. The ratings may be simple yes/no, or more complicated, such as ratings on a scale from 1 to 10, or a letter-grade scale.

In step 232, the images received from the first set of providers are tested using a first predetermined quality criterion or criteria, and, in step 235, the images that pass the first predetermined quality criterion (or criteria) are sent (e.g., electronically from the system 100, over the network 190) to be vetted by a pool of facial expression experts. The first quality criterion may be, for example, at least N of untrained providers agree that the expression matches that of an emotion X. The number N may be an absolute predetermined threshold number (five, for example), a scaled predetermined threshold number (N out of M, such as 6 out of 10), a predetermined threshold percentage (65%, for example). The percentages and numbers given here are exemplary and not necessarily limiting.

In step 240, the system 100 receives the decisions of the experts for each of the vetted images, and stores the decisions. For example, the system 100 may receive the decisions of the experts over the network 100.

In step 245, a second predetermined quality criterion (or criteria) is (or are, as the case may be) used to accept an image as a positive example. The second quality criterion or criteria may be set in a way that is analogous to the way the first predetermined quality criterion was set, for example, at least P experts agree that the expression matches that of an emotion X. The number P may be an absolute number, a scaled number, or a percentage.

In embodiments, only a single expert is used. The single expert may be asked, for example, to rate the images on a pass/fail basis, or to select and assign a grade, from among two, three or more available grades, to the image with respect to each particular type of expression. In other embodiments, two, three, or more experts may be used.

In step 250, the system selects some or all of the images that have been vetted by the experts as training data for an expression recognition machine (classifier). For example, all or a predetermined portion of the available training images or a predetermined number of the images may be selected.

In step 255, the expression recognition machine is trained using the training data. Some of the machine learning techniques that may be employed in this step are described below and elsewhere in this document. Other machine learning and optimization techniques may also be employed.

In step 260, the expression recognition machine trained in the step 255 is used. For example, the machine may be implemented in a camera to allow the camera's user to capture automatically images with the specific expressions. As another example, the expression recognition machine judges people's reactions resulting from exposure to certain stimulus or stimuli, such as advertisements. As still another example, the expression recognition machine may be implemented on a user's computer or over the network (through a browser, perhaps) to allow the user to self-train in creating various expressions; the user may be enabled to capture the user's image (picture/video) and rate the image for presence of a given expression (concern, attention, joy, etc.) using the classifier.

At flow point 299, the process ends; it may be repeated in whole or in part as needed.

The process 200 yields what is known a "positive examples." In other words, the examples are of a particular expression which is sought to be matched. Importantly, positive examples from one expression (x) may be considered as negative examples of another expression (y), if those two expressions are known to be incompatible (e.g., "happy" and "sad"). Moreover, the images that rate poorly as expressions of a particular emotion, affective state, or action unit may be used in machine learning as negative examples of that same emotion, affective state, or action unit. Thus, the training in the step 255 may be for positive recognition of the expression of the positive example (x), or for training for non-recognition of the same expression as that of the other (negative) emotion (y).

Figure 3:
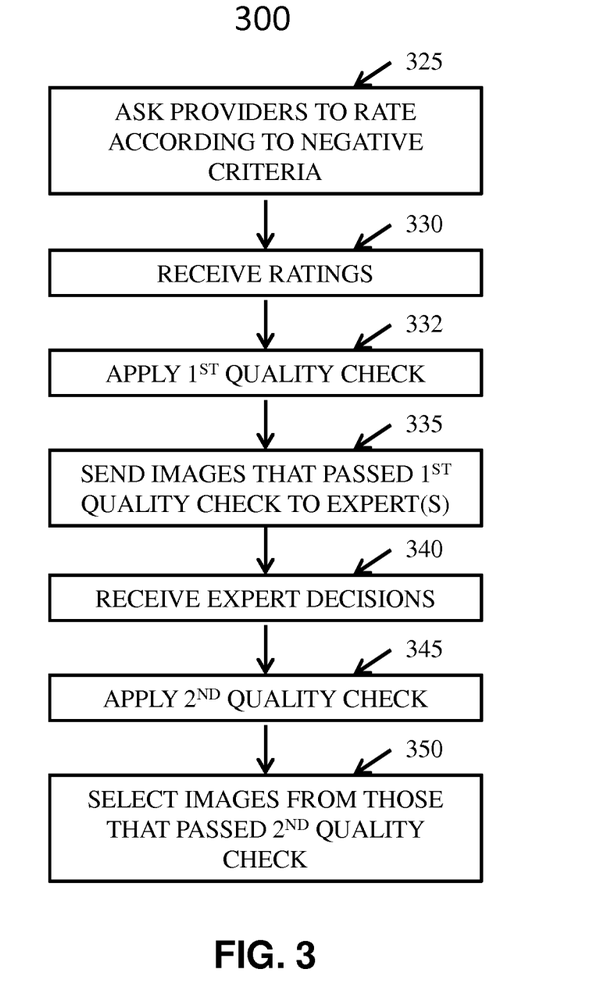
FIG. 3 illustrates selected steps of a process for generating negative examples of training data for automatic expression classifiers.

The steps 225 through 250 of the process 200 may be considered to be a "pipeline" for reducing the cost of generating both positive and negative examples for training expression recognition machines. Thus, all kinds of facial images may be collected by various means (from a web search, for example), and passed through the pipeline to generate either positive or negative examples. For negative examples, the providers of the second set may be asked whether each image is clearly not the expression of the target emotion. A process 300 of FIG. 3 illustrates this approach to the generation of negative examples.

The step 325 is analogous to the step 225, but geared to the generation of negative rather than positive examples. Thus, one or more providers (of a second set or of a third set, which may be similar to the second set) are asked to rate the images with the expressions from the first set of providers, with respect to a set of predetermined criteria or criterion. These providers also need not be specially trained in facial expression recognition. For example, the system 100 and/or the machines 180 of the respective providers cause to be displayed to the providers the criteria and/or the questions. For example, displaying an image and asking "does this look like a smile?" The displayed information (criteria/questions) may ask the providers of the second set, how well does the displayed expression matches a specific emotion, such as anger, contempt, disgust, fear, happiness, sadness, surprise, or another expression or affective state; the specific emotion, affective state, or action unit may be the same one that the providers of the first state were asked to mimic. The emotion, affective state, or action unit may be different from the emotion, affective state, or action unit mimicked by the providers who generated the images. In embodiments, the providers of the second set may be asked to grade the expressions pass/fail. In embodiments, the providers of the second set may be asked to grade the expressions; the grades may be as follows: 1. Looks nothing like it; 2. A poor attempt; 3. OK; 4. A pretty good attempt; 5. Incredibly good mimicking.

In embodiments, the providers of the step 325 may all be different from the providers of the first set, or there may be at least some or even a complete overlap between the providers of the second set and the providers of the first set. In variants that are not necessarily limiting, no provider is asked to rate his or her own submission(s) of the images with the expressions.

In step 330, which is identical or analogous to the step 230, the system 100 receives the responses of the providers, which response were generated in response to the step 325.

In step 332, which is identical or analogous to the step 232, the images received from the first set of providers are tested using a first predetermined quality criterion or criteria. In step 335, which is analogous to the step 235, the images that pass the first predetermined quality criterion (or criteria) are sent (e.g., electronically from the system 100, over the network 190) to be vetted by a pool of facial expression experts. The first quality criterion may be, for example, at least N of untrained providers agree that the expression is a bad expression of emotion X. The number N may be an absolute predetermined threshold number (five, for example), a scaled predetermined threshold number (N out of M, such as 6 out of 10), a predetermined threshold percentage (65%, for example). The percentages and numbers given here are exemplary and not necessarily limiting.

In step 340, the decision(s)/rating(s) of the expert(s) is/are received, for example, by the system 100 through the network 190.

In step 345, which is identical or analogous to the step 245, a second predetermined quality criterion (or criteria) is (are) used to accept an image as a negative example. The second quality criterion/criteria may be set in a way that is analogous to the way the first predetermined quality criterion was set, for example, at least P experts agree that the expression is a bad expression of the emotion X. The number P may be an absolute number, a scaled number, or a percentage. In embodiments, only a single expert is used. The single expert may be asked, for example, to rate the images on a pass/fail basis, or to select and assign a grade, from among two, three or more available grades, to the image with respect to each particular type of expression. In other embodiments, two, three, or more experts may be used.

In step 350, which is identical or analogous to the step 250, the system selects some or all of the images that have been vetted by the experts as training data for an expression recognition machine. Here, however, the training data are negative examples. For example, all or a predetermined portion of the available training images or a predetermined number of the images may be selected.

A goal of the pipelines (both positive and negative) may be to minimize the cost and time per image that is accepted as an example. Setting the parameters for selection (the first and second predetermined criteria) may thus be based on a cost function. The cost function may be based on a weighted combination of time and cost, or simply the actual cost that accounts for both the cost of the untrained providers and of the experts. Mathematical models may be used to minimize the cost function as a function of the number of untrained subjects and of the strength of the response of the experts. These parameters may be further tuned using reinforcement learning approaches applied to the machine learning.

Thus, the training data collected using the approaches described above may be used to develop a first generation expression recognition system using machine learning methods (e.g., pattern recognizers, neural networks, support vector machines, adaboost, and possibly other types of classifiers). The techniques can be further extended to collecting the data that "breaks" some version (e.g., the current version) of the expression recognizer. Thus, the system may be configured to ask the crowdsourcing providers to send example images for which the system makes mistakes. This can also be done by embedding applications with the ability to send data to a central server. The new break-me examples may then be vetted using an approach (pipeline) analogous to that described above for collecting positive and/or negative examples. The new data are then used for training, to develop a second generation expression recognition system. The process can be iterated to develop a third generation system, etc.

Figure 4:
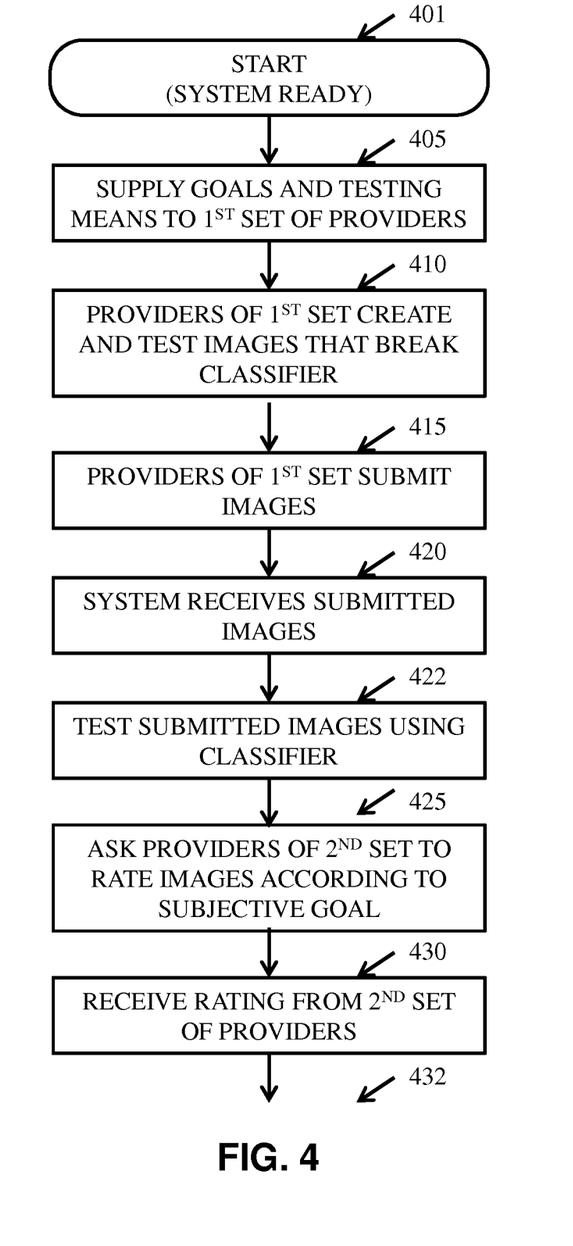
FIG. 4 illustrates selected steps of a process for generating recognizer "breaking" data for training automatic expression classifiers.

In an embodiment, the system asks the crowdsourcing providers to create examples of expression of a certain emotion (e.g., anger) that would be generally recognized as that expression by people but that would cause the expression recognizer (i.e., detector or classifier) not to identify it as that particular emotion such as anger (and possibly to identify it as another type of emotion, such as happiness); or vice versa, the system asks the crowdsourcing providers to create examples of expression that do not appear to people as expressions corresponding to a certain emotion (e.g., anger), but that would cause the expression recognizer (i.e., detector or classifier) to identify it as that particular emotion. The providers would then send the images that they identify as such to the system; the system would receive and store them with appropriate descriptions. The images would then be sent through the pipeline such as that described in relation to FIG. 2 (steps 225-260) and FIG. 3. FIG. 4 illustrates a method 400 for obtaining such data that "breaks" a detector.

In step 405, one or more providers of a first set of providers are given goals (similar to the cues/instructions described above) for creating images wherein the facial expression appears as a first type of expression but which the classifier does not classify as the first type; alternatively, a goal may be to create a facial expression that does not look like the first type of expression, but that the classifier classifies as the first type of expression; or vice versa. For example, the providers of the first set may be asked to create expressions that look like anger, but are not classified as anger by the current generation classifier; or the providers may be asked to create expressions that do not look like anger, but are classified as anger by the classifier. The providers may be supplied with a means to classify the images they create with the classifier. For example, the classifier may be made available online, or installed on the providers' machines 180. As before, the providers of the first set need not be specially trained in facial expression recognition. The goals and/or the cues/instructions may be stored in the database 160 or elsewhere.

In step 410, the providers of the first set create the expressions, capture them, and test them against the classifier. For example, the providers capture their images using the cameras in their respective machines 180, and test them also using the machines 180 to access the classifier.

If a particular provider is satisfied that he or she has achieved the goal(s) with a particular image, the provider submits the image to the system 100, for example, by selecting a menu item that causes the image to be transmitted over the network 190. This is done in step 415.

In step 420, the system 100 receives the images submitted by the providers.

In step 422, the system tests the received images using the same classifier as the one that was used by the providers of the first set, and/or one or more other classifiers. If a particular image does not meet the objective goal, the image is discarded. If, for example, the goal was to obtain images that are classified as anger (but does not look like anger), and when the system submits the image to the classifier the output of the classifier is not anger, then the image may be discarded (not used further in the method). Similarly, if the goal was to obtain images that are not classified as anger (but appear as anger to people), then the image may be discarded if the classifier output corresponds to anger.

In step 425, one or more providers of a second set of providers are asked to rate the images with respect to the subjective goal used by the first set of providers. (The providers of the second set also need not be specially trained in facial expression recognition.) Continuing with the example of the immediately preceding paragraph, the providers of the second set may be asked whether an image is of an angry face.

In embodiments, the providers of the second set are all different from the providers of the first set. In embodiments, there may be at least some or even a complete overlap between the providers of the second set and the providers of the first set. In embodiments, there may be at least some or even a complete overlap between the providers of the second set and the providers of the first set. In variants that are not necessarily limiting, no provider is asked to rate his or her own submission(s) of the images with the expressions.

In step 430, the providers of the second set rate the images based on the subjective criteria, the machines 180 receive the ratings given by the providers of the second set and transmit them to the system 100, for example, over the network 190. The system 100 receives the ratings. The ratings may be simple yes/no (looks like anger or does not look like anger), or more complicated, such as a rating on a scale from 1 to 10.

In step 432, the images are tested using a first predetermined quality criterion or criteria, and, in step 435, the images that pass the first predetermined quality criterion (or criteria) test are sent (e.g., electronically from the system) to be vetted by a pool of facial expression experts. The first quality criterion may be, for example, at least N of untrained providers agree that the expression matches that of an emotion X. The number N may be an absolute predetermined threshold number (five, for example), a scaled predetermined threshold number (N out of M, such as 6 out of 10), a predetermined threshold percentage (65%, for example). The percentages and numbers given here are exemplary and not necessarily limiting.

In step 440, the system 100 receives the decisions of the experts for each of vetted images, and stores the decisions.

In step 445, the system applies a second predetermined quality criterion (or criteria) to accept an image as a "break" the classifier example. The second quality criterion or criteria may be set in a way that is analogous to the way the first predetermined quality criterion was set, for example, at least P experts agree that the expression matches (or does not match) that of an emotion X. The number P may be an absolute number, a scaled number, or a percentage.

In embodiments, only a single expert is used. The single expert may be asked, for example, to rate the images on a pass/fail basis, or to assign a grade of three or more available grades to the image with respect to each particular type of expression. In other embodiments, two, three, or more experts are used.

In step 450, the system selects some or all of the images that have been vetted by the experts as training data for the classifier that was "broken" by the data.

In step 455, the classifier is trained by the "breaking" data, and becomes the next generation classifier. The above steps may be iterated one or more times, to refine the classifier further.

In step 460, the classifier is used in a manner such as that described above in relation to the step 260.

At flow point 499, the process ends, to be repeated in whole or in part as needed.

Figure 5:
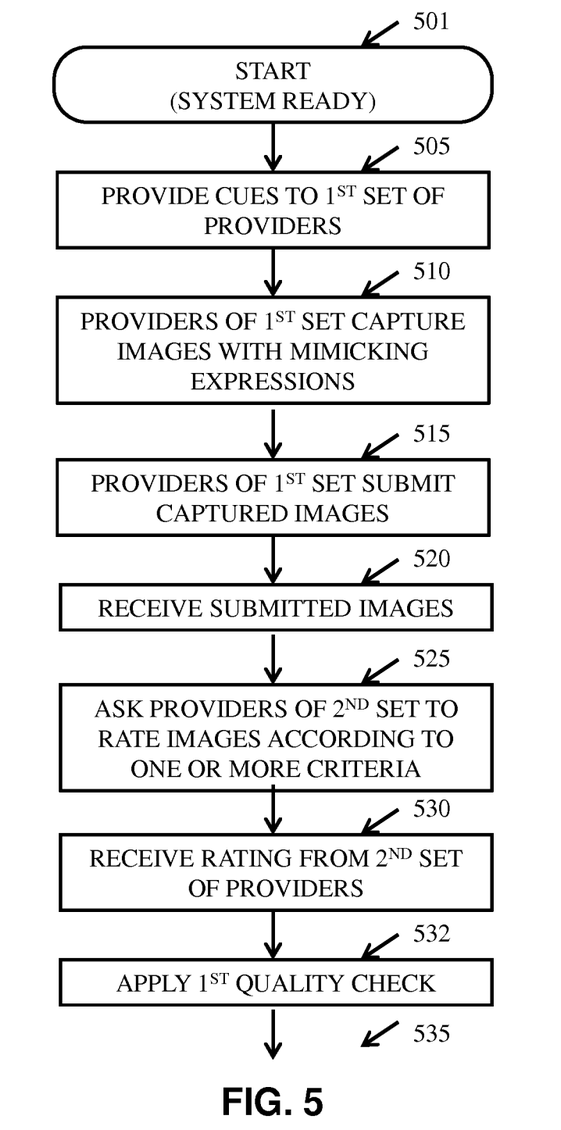
FIG. 5 illustrates selected steps/block(s) of an iterative process for generating training data for automatic expression classifiers.

FIG. 5 shows selected steps/block(s) of an iterative method 500, which is based on the method 200 described above in connection with FIG. 2. Here, however, a decision is made in decision block 556 whether to proceed with finding discrepancies between the labels assigned by the human labelers/provider (which can be the providers of the second set) and the corresponding outputs of the trained classifier. The decision may be based on whether a predetermined number if iterations (e.g., two, three, or more) has been reached, or on another criteria. If the decision is not to proceed, the process flow advances to step 560 (similar or identical to the step 260 of the method 200), to use the trained expression recognition machine.

Otherwise, the process flow continues to a step 557, where images with discrepancies between human ratings and outputs of expression recognition machine are selected; for example, all such images may be selected.

From the step 557, the process flow continues to step 558, to request human labelers (such as the providers of the second set) for an additional opinion to confirm or disconfirm the discrepancy. When such discrepancy is found, the process continues to ask the experts for a second opinion. This second opinion is included in the second (or subsequent) round of training of the expression recognition machine. The process may be iterated a few times (e.g., asking for a third, fourth opinion, etc.) Basically, this is an iterative mechanism to refine the human-assigned labels. According to this process, second, third, and subsequent opinions are not requested for all the labels, but just for additional opinions when there is a discrepancy between the human-assigned labels and the system outputs. For example, if the experts indicate that image X shows fear but the expression recognizer indicates that it does not show fear, the image X is sent back to the experts for an additional opinion.

FIG. 5 shows a modification of the process 200. Analogous changes may be made to the processes 300 and 400, to effect iterations in order to refine these processes.

The system and process features described throughout this document may be present individually, or in any combination or permutation, except where presence or absence of specific feature(s)/element(s)/limitation(s) is inherently required, explicitly indicated, or otherwise made clear from the context.

Although the process steps and decisions (if decision blocks are present) may be described serially in this document, certain steps and/or decisions may be performed by separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other forms of non-transitory storage medium known in the art, whether volatile or non-volatile. Exemplary storage medium or media may be coupled to one or more processors so that the one or more processors can read information from, and write information to, the storage medium or media. In an alternative, the storage medium or media may be integral to one or more processors.

This document describes in considerable detail the inventive apparatus, methods, and articles of manufacture for obtaining and using training data for machine learning systems. This was done for illustration purposes. The specific embodiments or their features do not necessarily limit the general principles underlying the invention. The specific features described herein may be used in some embodiments, but not in others, without departure from the spirit and scope of the invention as set forth herein. Various physical arrangements of components and various step sequences also fall within the intended scope of the invention. Many additional modifications are intended in the foregoing disclosure, and it will be appreciated by those of ordinary skill in the pertinent art that in some instances some features will be employed in the absence of a corresponding use of other features. The illustrative examples therefore do not necessarily define the metes and bounds of the invention and the legal protection afforded the invention, which function is carried out by the claims and their equivalents.

What is claimed is:

1. A computer-implemented method comprising:
   instructing a first plurality of provider devices to provide one or more cues to mimic a predetermined expression, each of the first plurality of provider devices corresponding to an untrained provider;
   receiving, from at least one provider device from amongst the first plurality of provider devices, image data responsive to the one or more cues;
   sending, to a second plurality of provider devices, requests for ratings corresponding to the image data, each of the second plurality of provider devices corresponding to a second untrained provider;
   receiving, from at least one provider device from amongst the second plurality of provider devices, ratings corresponding to the sent image data;
   applying a quality check to the image data, the quality check based on the received ratings; and
   storing the image data that passed the quality check.

2. The computer-implemented method of claim 1, further comprising:
   training a classifier to classify one or more images depicting an emotional state, affective state, or action unit associated with the predetermined expression using at least a portion of the image data that passed the quality check; and
   using the classifier to classify additional image data.

3. The computer-implemented method as recited in claim 2, wherein:
   the predetermined expression is an expression of a predetermined emotional state, affective state, or action unit;
   the classifier is a classifier of the predetermined emotional state, affective state, or action unit; and
   providing one or more cues comprises providing one or more cues to mimic the predetermined emotional state, affective state, or action unit, and training the classifier comprises training the classifier of the predetermined emotional state, affective state, or action unit.

4. The computer-implemented method as recited in claim 3, wherein providing one or more cues, receiving image data responsive to the one or more cues, sending requests for ratings corresponding to the image data, and receiving ratings corresponding to the image data are performed by a computer-based system over a network coupling the computer-based system to the first plurality and second plurality of provider devices.

5. The computer-implemented method as recited in claim 4, wherein providing one or more cues comprises at least one of: sending instructions over the network from the computer-based system to the first plurality and second plurality of provider devices, and sending one or more predetermined images over the network.

6. The computer-implemented method as recited in claim 4, wherein using the classifier comprises programming a camera to capture pictures depicting the predetermined expression.

7. The computer-implemented method as recited in claim 4, wherein using the classifier comprises programming an electronic device to evaluate images depicting human facial expressions.

8. The computer-implemented method as recited in claim 4, wherein using the classifier comprises providing training instructions for creating the predetermined expression, wherein the classifier is employed to rate a picture of a user for appearance of the predetermined expression.

9. The computer-implemented method as recited in claim 2, further comprising:
   detecting, from amongst the image data that passed the quality check, discrepant images that cause a discrepancy between designations received from the second plurality provider devices and designations assigned by the classifier;
   sending at least a portion of discrepant image data to the second plurality of provider devices;

receiving ratings of at least a portion of the sent discrepant image data from the second plurality of provider devices;

applying a secondary quality check to the discrepant image data corresponding to the ratings received from the second plurality of provider devices; and further training the classifier with respect to the discrepant image data that passed the secondary quality check.

10. A computer-implemented method, the method comprising:

providing, to a first plurality of electronic devices, instructions to render prompts for testing a classifier, the classifier comprising a machine-learning classifier of a predetermined depiction corresponding to a predetermined emotional state, affective state, or action unit associated with the predetermined expression;

receiving, from the first plurality of electronic devices, a plurality of images responsive to the prompts;

checking the received images using the classifier and discarding images that do not meet a predetermined standard applied to output of the classifier, resulting in objectively qualified images that pass the predetermined standard;

sending, to a second plurality of electronic devices, instructions to display requests to rate the objectively qualified images with respect to appearance of the predetermined emotional state, affective state, or action unit in the objectively qualified images;

receiving ratings from the second plurality of electronic devices, responsive to the requests;

applying a first quality check to the received images based on the ratings received from the second plurality of electronic devices, resulting in a plurality of images that passed the first quality check;

sending the plurality of images that passed the first quality check to one or more electronic devices, and instructing the one or more electronic devices to display requests to rate the plurality of images that passed the first quality check with respect to appearance of the predetermined emotional state, affective state, or action unit in the plurality of images that passed the first quality check;

receiving ratings from the one or more electronic devices, responsive to sending the plurality of images that passed the first quality check;

applying a second quality check to the images corresponding to the ratings received from the one or more electronic devices; and storing at least a portion of the images passing the second quality check.

11. The computer-implemented method as recited in claim 10, wherein:

the instructions comprise instructions to create positive example images that, upon classification by the classifier, cause the classifier to correctly indicate non-appearance of the predetermined emotional state, affective state, or action unit;

the method further comprising:

training the classifier using the one or more images that passed the second quality check as positive examples of appearance of the predetermined emotional state, affective state, or action unit; and using the classifier after the step of training.

12. The computer-implemented method as recited in claim 10, wherein providing instructions to render prompts, receiving from the first plurality of electronic devices responsive to the prompts, sending, to a second plurality of electronic devices, requests to rate, and receiving ratings from the second plurality of electronic devices are performed by a computer-based system over a network coupling the computer-based system to the first and second pluralities of electronic devices.

13. The computer-implemented method as recited in claim 12, wherein providing instructions to render prompts comprises sending one or more images over the network from the computer-based system to the first plurality of electronic devices.

14. The computer-implemented method as recited in claim 12, wherein using the classifier comprises programming the classifier into a camera to enable the camera to capture pictures depicting the predetermined emotional state, affective state, or action unit.

15. The computer-implemented method as recited in claim 12, wherein using the classifier comprises programming the classifier into a device configured to evaluate reactions resulting from exposure to one or more stimuli.

16. The computer-implemented method as recited in claim 12, wherein using the classifier comprises using the classifier to display self-training instructions for creating an appearance of the predetermined emotional state, affective state, or action unit.

17. The computer-implemented method as recited in claim 10, further comprising:

creating negative example images that cause the classifier to incorrectly indicate appearance of the predetermined emotional state, affective state, or action unit;

training the classifier using the one or more images that passed the second quality check as negative examples of appearance of the predetermined emotional state, affective state, or action unit; and using the trained classifier.

18. A computer system comprising:

at least one processor;

at least one memory device coupled to the processor and storing one or more cues for mimicking expression of a predetermined emotional state, affective state, or action unit; and at least one network interface coupled to the processor and coupled to at least one network, wherein the at least one processor is configured to:

send through the at least one network interface the one or more cues to a first plurality of electronic devices;

receive from at least some of the first plurality of electronic devices, images responsive to the one or more cues;

send, to a second plurality of electronic devices through the at least one network interface, requests to rate the images;

receive ratings from at least some of the second plurality of electronic devices responsive to the requests;

apply a first quality check to the images based on the ratings received from the second plurality of electronic devices, thereby obtaining one or more images that passed the first quality check;

send the one or more images that passed the first quality check to one or more electronic devices along with requests for ratings of the one or more images;

receive one or more ratings from at least one electronic device from amongst the one or more electronic devices, the ratings corresponding to at least a portion of the images sent to the electronic devices;

apply a second quality check to the images based on the one or more ratings received from the one or more electronic devices; and store those images passing the second quality check.

19. A system for collecting machine learning training data, the system comprising:
- at least one processor; and
- at least one non-transitory computer readable storage medium coupled to the processor, the non-transitory computer readable storage medium storing instructions which, upon execution by the processor, are operative to cause the processor to:
  - receive image data corresponding to at least one image from a first provider device;
  - receive at least one selection corresponding to the image data from a second provider device;
  - assign a rating to the image data based on the received selection;
  - determine that the rating satisfies at least one quality criterion;
  - instruct, upon such determination, a third provider device to render a prompt for at least one supplemental selection corresponding to the image data on a display of the third provider device;
  - receive, from the third provider device, at least one supplemental selection corresponding to the image data; and
  - assign a secondary rating to the image data based on the received supplemental selection.

* * * * *